(12) United States Patent
Czapla et al.

(10) Patent No.: US 11,840,962 B2
(45) Date of Patent: Dec. 12, 2023

(54) AIRCRAFT COMPRISING A HYDROGEN SUPPLY DEVICE INCORPORATING A HYDROGEN HEATING SYSTEM POSITIONED IN THE FUSELAGE OF THE AIRCRAFT

(71) Applicants: Airbus SAS, Blagnac (FR); Airbus Operations SAS, Toulouse (FR)

(72) Inventors: Lionel Czapla, Toulouse (FR); Antoine Abele, Toulouse (FR); Benjamin Thubert, Toulouse (FR); Alexis Pissavin, Blagnac (FR); Abhishek Verma, Toulouse (FR); Alistair Forbes, Toulouse (FR); Jorge A. Carretero Benignos, Taufkirchen (DE); Benedikt Bammer, Danauworth (DE)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 17/878,331

(22) Filed: Aug. 1, 2022

(65) Prior Publication Data
US 2023/0045036 A1 Feb. 9, 2023

(30) Foreign Application Priority Data

Aug. 3, 2021 (FR) ...................................... 2108416

(51) Int. Cl.
*F02C 7/224* (2006.01)
*B64D 37/04* (2006.01)
(Continued)

(52) U.S. Cl.
CPC .............. *F02C 7/224* (2013.01); *B64D 37/04* (2013.01); *B64D 37/30* (2013.01); *B64D 37/34* (2013.01);
(Continued)

(58) Field of Classification Search
CPC .. F02C 7/224; F02C 3/22; F02C 7/222; F02C 9/40; B64D 37/04; B64D 37/30; B64D 37/34; F05D 2220/323; F05D 2260/213
See application file for complete search history.

(56) References Cited

U.S. PATENT DOCUMENTS

| 2008/0006743 | A1 | 1/2008 | Miller et al. |
| 2013/0255281 | A1* | 10/2013 | Bray .................... B64D 37/30 62/62 |

OTHER PUBLICATIONS

French Search Report; priority document.

* cited by examiner

*Primary Examiner* — Gerald L Sung
*Assistant Examiner* — Rene D Ford
(74) *Attorney, Agent, or Firm* — Greer, Burns & Crain, Ltd.

(57) ABSTRACT

An aircraft including a fuselage, a wing structure, at least one turbomachine running on hydrogen and generating thrust at a propulsion unit distant from the fuselage, at least one fuel tank positioned in the fuselage and configured to store hydrogen in the cryogenic state, at least one hydrogen supply device connecting the fuel tank and the turbomachine and including at least one pump positioned in the fuselage in the vicinity of the fuel tank, at least one hydrogen heating system positioned in the fuselage in the vicinity of the pump. This solution makes it possible to reduce a length of the complex double-walled pipes configured for carrying the hydrogen in the cryogenic state between the fuel tank and the hydrogen heating system.

11 Claims, 3 Drawing Sheets

(51) Int. Cl.
*B64D 37/30* (2006.01)
*F02C 3/22* (2006.01)
*B64D 37/34* (2006.01)
F02C 7/22 (2006.01)
F02C 9/40 (2006.01)

(52) U.S. Cl.
CPC ................ *F02C 3/22* (2013.01); *F02C 7/222* (2013.01); *F02C 9/40* (2013.01); *F05D 2220/323* (2013.01); *F05D 2260/213* (2013.01); *F05D 2260/232* (2013.01); *F05D 2260/606* (2013.01)

AIRCRAFT COMPRISING A HYDROGEN SUPPLY DEVICE INCORPORATING A HYDROGEN HEATING SYSTEM POSITIONED IN THE FUSELAGE OF THE AIRCRAFT

CROSS-REFERENCES TO RELATED APPLICATIONS

This application claims the benefit of the French patent application No. 2108416 filed on Aug. 3, 2021, the entire disclosures of which are incorporated herein by way of reference.

FIELD OF THE INVENTION

The present application relates to an aircraft comprising a hydrogen supply device incorporating a hydrogen heating system positioned in the fuselage of the aircraft.

According to one embodiment visible in FIG. 1, an aircraft 10 comprises a fuselage 12, a wing structure 14 and several propulsion units 16 positioned on each side of the fuselage, connected to the wing structure 14 and each comprising a turbomachine 18.

In the case of an aircraft running on a hydrocarbon-based fuel, the aircraft 10 comprises fuel tanks 20 incorporated into the wing structure 14 and a fuel supply device 22 connecting each turbomachine 18 to a fuel tank 20. In one configuration, the fuel supply device comprises at least a pump 24 and at least a heat exchanger 26 for preheating the fuel. This heat exchanger 26, which uses at least a source of heat from the turbomachine 18, is positioned at the propulsion unit 16.

In the case of an aircraft running on hydrogen, the latter comprises at least one fuel tank positioned in the fuselage and configured to store the hydrogen in the liquid and cryogenic state. The aircraft also comprises a hydrogen supply device connecting each turbomachine to a fuel tank and comprising a high-pressure pump and a heat exchanger. In so far as the energy required to compress the hydrogen is lower when the hydrogen is in the liquid state, the high-pressure pump is positioned at the outlet of the fuel tank. As the sources of heat are essentially produced by the turbomachines, the heat exchangers are positioned in the vicinity of the turbomachines in the propulsion units. To complement this, the hydrogen supply device comprises pipes to carry the hydrogen at high pressure, in the liquid and cryogenic state, from the high-pressure pump positioned in the fuselage as far as the heat exchanger positioned in one of the propulsion units. Given the liquid and cryogenic state, the pipes are complex double-walled thermally insulated pipes, the space between the two walls being inerted or evacuated.

The use of complex double-walled pipes, combined with the significant distance separating the high-pressure pump and the heat exchanger leads to high costs and significantly increases the on-board mass. Because such double-walled pipes are short, it is necessary to provide numerous couplings which even further increase the costs and the on-board mass.

Document US2008/006743 discloses an aircraft with a high-flying altitude and long endurance, powered by hydrogen and comprising a tank of cryogenic fluid positioned in the fuselage of the aircraft, the aircraft propulsion system being arranged on the fuselage or on the wing of the aircraft.

SUMMARY OF THE INVENTION

The present invention seeks to overcome all or some of the disadvantages of the prior art. To this end, the subject matter of the invention is an aircraft comprising a fuselage, a wing structure, at least one propulsion unit connected to the wing structure and distant from the fuselage, at least one turbomachine running on hydrogen and generating thrust at the propulsion unit, at least one fuel tank positioned in the fuselage, and configured to store hydrogen in the liquid and cryogenic state, and at least one hydrogen supply device connecting the turbomachine and the fuel tank, this hydrogen supply device comprising at least one pump connected to the fuel tank and positioned in the fuselage in the vicinity of the fuel tank as well as at least one hydrogen heating system positioned upstream of the turbomachine.

According to the invention, the hydrogen heating system is positioned in the fuselage in the vicinity of the pump or in the region of a junction connecting the fuselage and the wing structure.

This solution makes it possible to reduce the length of the complex double-walled pipes configured to carry the hydrogen in the cryogenic state between the fuel tank, the pump and the hydrogen heating system.

According to another feature, the hydrogen heating system is separated from the fuel tank by a distance less than 5 m.

According to another feature, the hydrogen heating system comprises at least a heat exchanger, at least an electrical heating system and/or at least a catalysis-heating system.

According to another feature, the hydrogen heating system comprises at least a heat exchanger through which a stream of air bled from outside the aircraft passes.

According to another feature, the hydrogen heating system comprises at least a heat exchanger configured to exchange heat energy between the hydrogen and a heat-transfer fluid coming from at least a source present in the aircraft.

According to another feature, the hydrogen heating system comprises at least a main heat exchanger configured to exchange heat energy between the hydrogen and an intermediate heat-transfer fluid passing through at least a secondary heat exchanger.

According to another feature, the hydrogen heating system comprises at least two main heat exchangers arranged in series and configured to exchange heat energy between the hydrogen and the one same intermediate heat-transfer fluid passing through at least one secondary heat exchanger.

According to another feature, the hydrogen heating system comprises a return circuit configured to tap off some of the heated hydrogen leaving the hydrogen heating system and reintroduce it into the inlet of the hydrogen heating system.

According to another feature, the propulsion unit comprises a multiblade propeller, and the turbomachine is positioned in the region of a junction connecting the fuselage and the wing structure, the aircraft comprising a mechanical drivetrain connecting the turbomachine and the multiblade propeller.

According to another feature, the turbomachine comprises a rotor which has an axis of rotation and it is positioned in such a way that this axis of rotation is parallel to a longitudinal axis of the fuselage.

According to another feature, the hydrogen supply device comprises a first double-walled pipe connecting the fuel tank and the pump and a second double-walled pipe connecting the pump and the hydrogen heating system.

According to another feature, the hydrogen supply device comprises a third double-walled pipe connecting the hydrogen heating system and the turbomachine.

According to another feature, the aircraft comprises propulsion units positioned on each side of the fuselage and connected to the wing structure, each propulsion unit being distant from the fuselage and comprising a turbomachine, said aircraft comprising a fuel tank common to said turbomachines and a hydrogen supply device for each turbomachine.

BRIEF DESCRIPTION OF THE DRAWINGS

Further features and advantages will become apparent from the following description of the invention, which description is given merely by way of example with reference to the attached drawings among which.

DETAILED DESCRIPTION OF THE PREFERRED EMBODIMENTS

Figure 1:
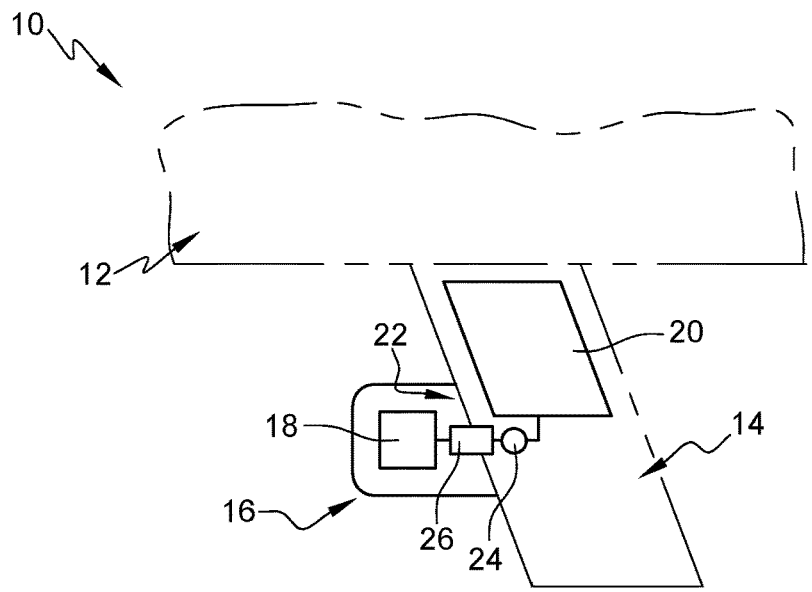
FIG. 1 is a schematic depiction of part of an aircraft comprising a fuel supply device illustrating one embodiment of the prior art.
Figure 2:
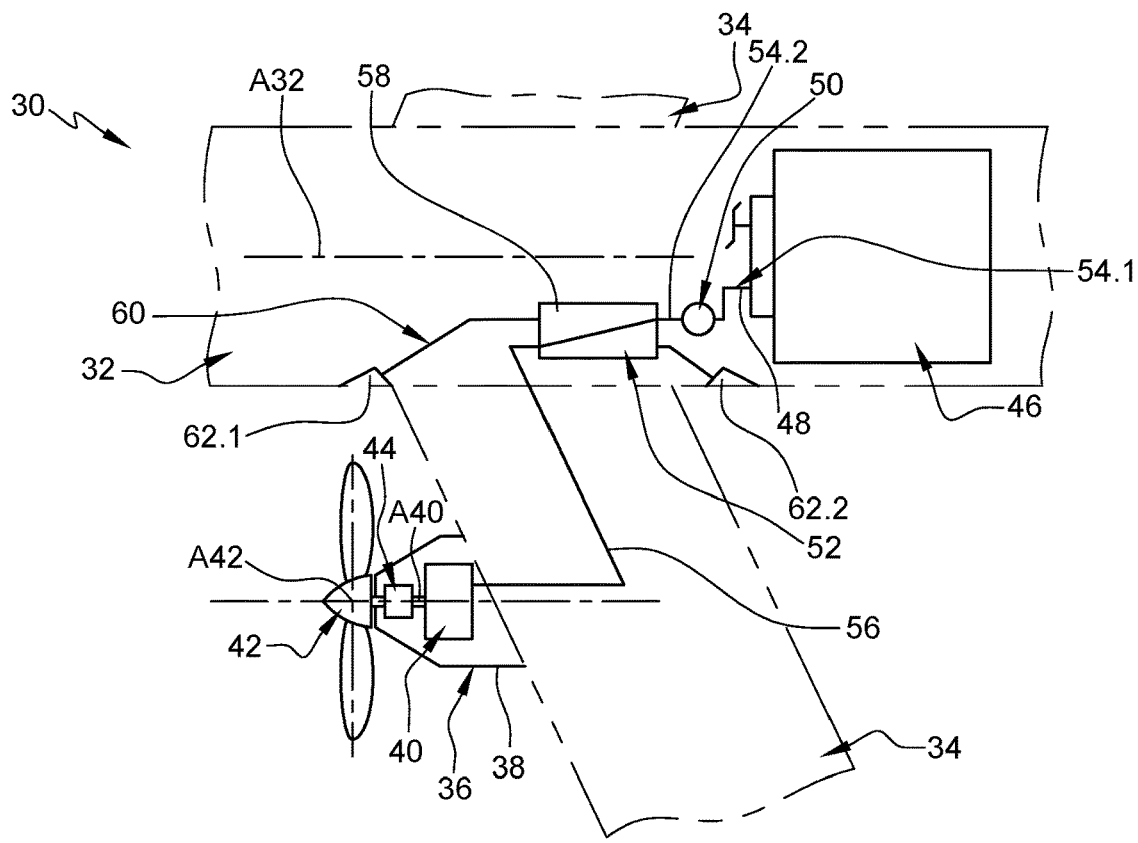
FIG. 2 is a schematic depiction of part of an aircraft comprising a hydrogen supply device illustrating one embodiment of the invention.
Figure 9:
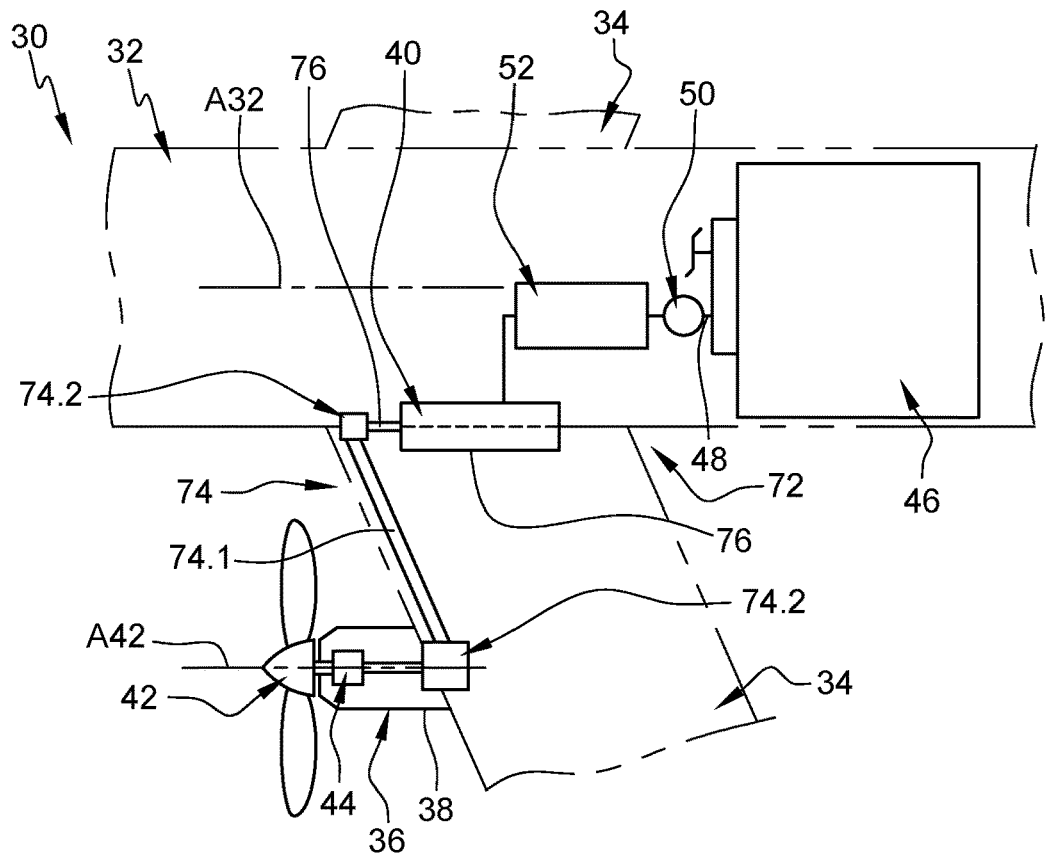
FIG. 9 is a schematic depiction of part of an aircraft comprising a hydrogen supply device and an offset turbomachine illustrating one embodiment of the invention.
Figure 10:
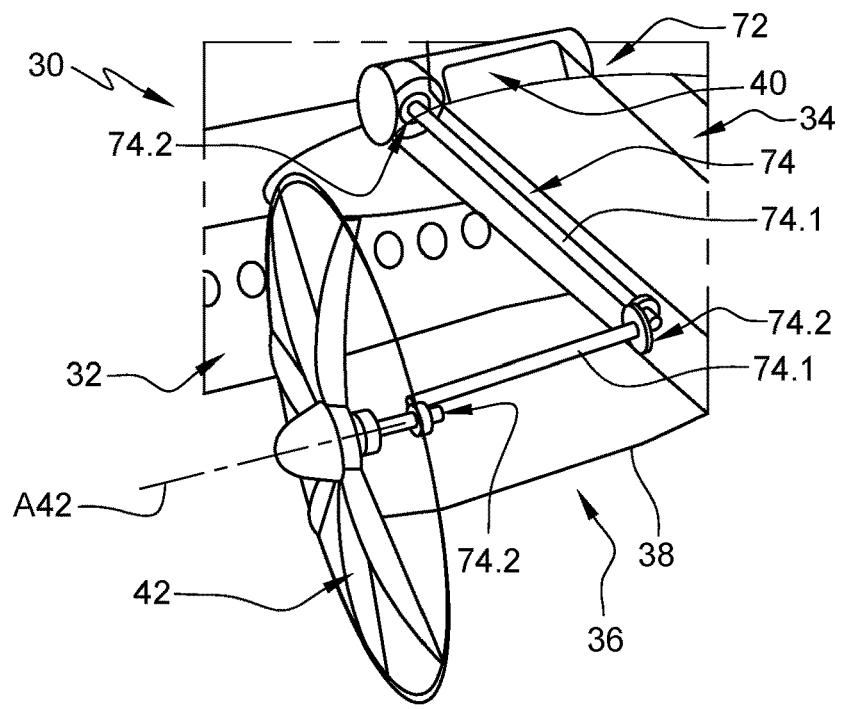
FIG. 10 is a perspective view of part of an aircraft showing, including hidden detail, an offset turbomachine illustrating one embodiment of the invention.

According to one embodiment visible in FIGS. 2, 9 and 10, an aircraft 30 comprises a fuselage 32, a wing structure 34 and propulsion units 36 positioned on each side of the fuselage 32 and connected to the wing structure 34. In the vicinity of the wing structure 34, the fuselage 32 is approximately cylindrical and has a longitudinal axis A32 parallel to the exterior wall of the fuselage 32.

According to one configuration, the propulsion units 36 are positioned beneath the wing structure 34. They are distant from the fuselage 32. In other words, the propulsion units 36 are positioned some distance from the fuselage 32, which is to say, there is a space between each propulsion unit 36 and the fuselage 32.

According to an embodiment visible in FIG. 2, each propulsion unit 36 comprises a nacelle 38, a turbomachine 40 positioned in the nacelle 38 and having an output shaft A40, a multiblade propeller 42 positioned on the outside of the nacelle 38 and having a rotation shaft A42 coupled to the output shaft A40 of the turbomachine 40. According to one configuration, the propulsion unit 36 comprises reduction gear 44 positioned inside the nacelle 38 and connecting the rotation shaft A42 of the multiblade propeller 42 and the output shaft A40 of the turbomachine 40.

Since the turbomachine 40 runs on hydrogen, the aircraft 30 comprises at least one fuel tank 46, positioned in the fuselage 32 and configured to store hydrogen in the liquid and cryogenic state, and a hydrogen supply device connecting the turbomachine 40 and the fuel tank 46.

The fuel tank 46 has at least one outlet 48. As an idea of scale, the hydrogen is at a pressure of the order of 3 bar and a temperature of the order of −243° C. at the outlet 48 of the fuel tank 46.

In one configuration, the aircraft 30 comprises one fuel tank common to a plurality of turbomachines 40 and one hydrogen supply device for each turbomachine 40. Of course, the invention is not limited to that configuration.

The hydrogen supply device comprises at least a pump 50 connected to the outlet 48 of the fuel tank 46 and at least one hydrogen heating system 52 upstream of the turbomachine 40.

According to one embodiment, the pump 50 is a high pressure pump. In one arrangement, the pump 50 is positioned in the fuselage 32 in the vicinity of the outlet 48 of the fuel tank 46. The pump 50 is positioned a short distance away from the outlet 48 of the fuel tank 46, for example at a distance of 5 m or less. Because the hydrogen is in the liquid state when it is compressed, this arrangement makes it possible to reduce the energy needed for compressing the hydrogen. As an idea of scale, the hydrogen in the liquid and the cryogenic state is at a pressure of the order of 50 bar at the outlet of the pump 50.

According to one particular feature of the invention, the hydrogen heating system 52 is positioned in the fuselage 32 in the vicinity of the pump 50 a short distance from the fuel tank 46. What is meant by a short distance is that the hydrogen heating system 52 is separated from the fuel tank 46 by a distance of less than 5 m. The hydrogen heating system 52 is preferably separated from the fuel tank 46 by a distance of less than 5 m, but could of course be separated from the fuel tank 46 by a distance greater than 5 m.

According to another particular feature of the invention, the hydrogen heating system 52 is positioned in the region of a junction 72 connecting the fuselage 32 and the wing structure 34, which is to say, at an interface between the fuselage 32 and the wing structure 34 (wing box) in the vicinity of the pump 50, a short distance from the fuel tank 46.

The hydrogen heating system 52 is configured so that the temperature of the hydrogen leaving it is an optimal temperature for the turbomachine 40. Thus, on leaving the hydrogen heating system 52, the hydrogen is in the gaseous state and no longer in the cryogenic state. As an idea of scale, the hydrogen is at a temperature of the order of 27° C. on leaving the hydrogen heating system 52.

The hydrogen supply device comprises a first double-walled pipe 54.1 connecting the fuel tank 46 and the pump 50, and a second double-walled pipe 54.2 connecting the pump 50 and the hydrogen heating system 52. These first and second double-walled pipes 54.1, 54.2 are configured to carry hydrogen in the liquid and cryogenic state. The cumulative length of the first and second double-walled pipes 54.1, 54.2 is reduced and markedly shorter by comparison with the length of such walls of the prior art, thus limiting the increase in on-board mass.

The hydrogen supply device comprises a third pipe 56 connecting the hydrogen heating system 52 and the turbomachine 40 and configured to carry hydrogen in the gaseous state. The third pipe 56 is a double-walled pipe, different than the first and second double-walled pipes 54.1, 54.2, and simpler, having a mass per unit length that is markedly lower than that of the first and second double-walled pipes 54.1, 54.2. In addition, because this third pipe 56 does not carry a fluid in the cryogenic state, the risks of icing of the aircraft structures that support it are low.

The hydrogen supply device may comprise a combination of various hydrogen heating systems 52.

According to another embodiment, the hydrogen heating system 52 comprises at least one heat exchanger 58.

According to an embodiment visible in FIG. 2, the hydrogen heating system comprises at least one heat exchanger 58 through which there passes a stream of air bled from outside the aircraft. The air stream is carried along a duct 60 connecting an air inlet 62.1 configured to bleed the air from outside the fuselage 32 and an air outlet 62.2 configured to eject the air to outside the fuselage 32.

According to another embodiment, the hydrogen heating system 52 comprises at least one heat exchanger 58 configured to exchange heat energy between the hydrogen and a heat-transfer gas coming from at least a source present in the aircraft, such as hot air from a turbomachine 40 or from an auxiliary power unit (APU) and used, amongst other things, for air conditioning the cabin of the aircraft.

According to another embodiment, the hydrogen heating system 52 comprises at least one heat exchanger 58 configured to exchange heat energy between the hydrogen and a heat-transfer liquid coming from at least one source present in the aircraft, such as the oil from a turbomachine 40 or from an auxiliary power unit.

According to another embodiment, the hydrogen heating system 52 comprises at least one heat exchanger 58 configured to exchange heat energy between the hydrogen and an intermediate heat-transfer fluid coming from at least one other heat exchanger configured to exchange heat energy between the intermediate heat-transfer fluid and a heat-transfer fluid coming from at least one source present in the aircraft, such as hot air or oil coming from a turbomachine 40 or from an auxiliary power unit.

As illustrated in FIGS. 3 to 8, the hydrogen heating system 52 comprises a combination of several heat exchangers.

Figure 3:
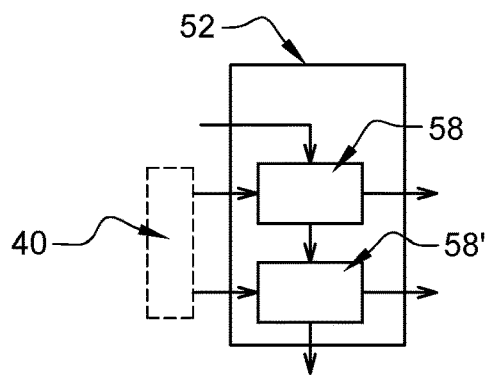
FIG. 3 is a schematic depiction of a heat exchanger of a hydrogen supply device illustrating one embodiment of the invention.

According to one embodiment visible in FIG. 3, the hydrogen heating system 52 comprises first and second heat exchangers 58, 58' in series, the first heat exchanger 58 being configured to exchange heat energy between the hydrogen and a heat-transfer fluid, such as oil for example, coming from a turbomachine 40 or from an auxiliary power unit, the second heat exchanger 58' being configured to exchange heat energy between the hydrogen and a heat-transfer fluid, such as hot air for example, coming from a turbomachine 40 or from an auxiliary power unit. According to this embodiment, the hydrogen heating system 52 may comprise a return circuit configured to tap off some of the heated hydrogen at the outlet of the hydrogen heating system 52 and reintroduce the heated hydrogen to the inlet thereof.

Figure 4:
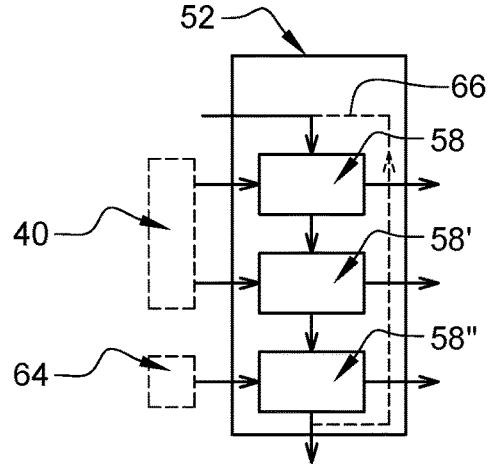
FIG. 4 is a schematic depiction of a heat exchanger of a hydrogen supply device illustrating another embodiment of the invention.

According to a second embodiment visible in FIG. 4, the hydrogen heating system 52 comprises three heat exchangers 58, 58', 58" in series, a first heat exchanger 58 configured to exchange heat energy between the hydrogen and a heat-transfer fluid, such as oil for example, coming from a turbomachine 40 or from an auxiliary power unit, a second heat exchanger 58' configured to exchange heat energy between the hydrogen and a heat-transfer fluid, such as hot air for example, coming from a turbomachine 40 or from an auxiliary power unit, a third heat exchanger 58" configured to exchange heat energy between the hydrogen and a heat-transfer fluid coming from another heat source 64 of the aircraft. According to this embodiment, the hydrogen heating system 52 comprises a return circuit 66 configured to tap off some of the heated hydrogen leaving the hydrogen heating system 52 and reintroduce the heated hydrogen to the inlet thereof.

Of course, the invention is not restricted to three heat exchangers in series.

Figure 5:
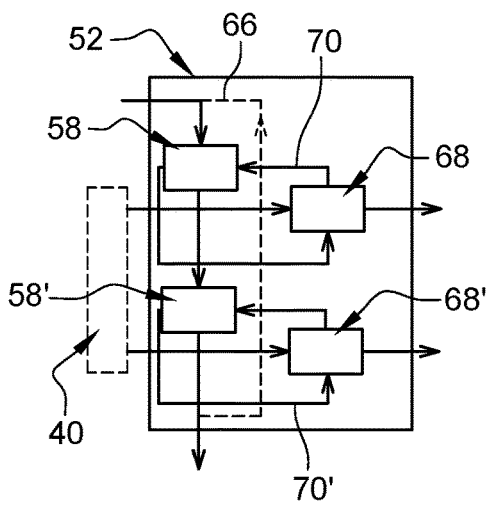
FIG. 5 is a schematic depiction of a heat exchanger of a hydrogen supply device illustrating another embodiment of the invention.

According to an embodiment visible in FIG. 5, the hydrogen heating system 52 comprises first and second main heat exchangers 58, 58' in series and first and second secondary heat exchangers 68, 68'. The first main heat exchanger 58 is configured to exchange heat energy between the hydrogen and a first intermediate heat-transfer fluid 70 coming from the first secondary heat exchanger 68 configured to exchange heat energy between the first intermediate heat-transfer fluid 70 and a heat-transfer fluid, such as oil for example, coming from a turbomachine 40 or from an auxiliary power unit. The second main heat exchanger 58' being configured to exchange heat energy between the hydrogen and a second intermediate heat-transfer fluid 70' coming from the second secondary heat exchanger 68' configured to exchange heat energy between the second intermediate heat-transfer fluid 70' and a heat-transfer fluid, such as hot air, coming from a turbomachine 40 or from an auxiliary power unit. According to one configuration, the hydrogen heating system comprises a return circuit 66 configured to tap off some of the heated hydrogen leaving the hydrogen heating system 52 and reintroduce it to the inlet thereof. In a variant, the hydrogen heating system 52 may comprise three or more main heat exchangers in series each coupled with a secondary heat exchanger. In this variant, a third main heat exchanger is configured to exchange heat energy between the hydrogen and a third intermediate heat-transfer fluid coming from a third secondary heat exchanger configured to exchange heat energy between the third intermediate heat-transfer fluid and a heat-transfer fluid coming from another heat source of the aircraft.

Figure 6:
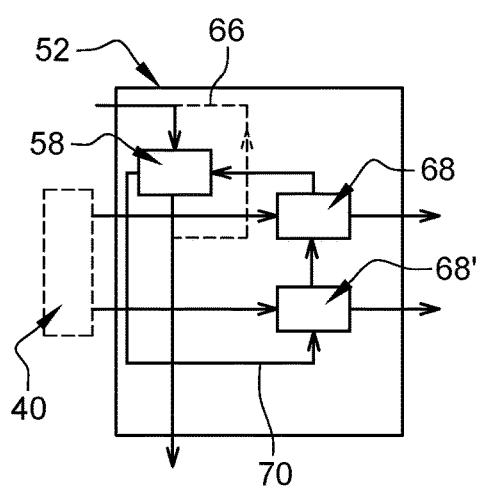
FIG. 6 is a schematic depiction of a heat exchanger of a hydrogen supply device illustrating another embodiment of the invention.

According to one embodiment visible in FIG. 6, the hydrogen heating system 52 comprises a main heat exchanger 58 and first and second secondary heat exchangers 68, 68' in series. The main heat exchanger 58 is configured to exchange heat energy between the hydrogen and an intermediate heat-transfer fluid 70 passing through the first and second secondary heat exchangers 68, 68'. The first secondary heat exchanger 68 is configured to exchange heat energy between the intermediate heat-transfer fluid 70 and a heat-transfer fluid, such as oil for example, coming from a turbomachine 40 or from an auxiliary power unit. The second secondary heat exchanger 68' is configured to exchange heat energy between the intermediate heat-transfer fluid 70 and a heat-transfer fluid, such as hot air for example, coming from a turbomachine 40 or from an auxiliary power unit. In one configuration, the hydrogen heating system 52 comprises a return circuit 66 configured to tap off some of the heated hydrogen leaving the main heat exchanger 58 and reintroduce it upstream of the latter.

In a variant, the hydrogen heating system 52 may comprise three secondary heat exchangers in series through which there passes an intermediate heat-transfer fluid 70 that passes through the main heat exchanger 58. In this variant, a third secondary heat exchanger 68 is configured to exchange heat energy between the intermediate heat-transfer fluid and a heat-transfer fluid coming from another heat source of the aircraft.

Figure 7:
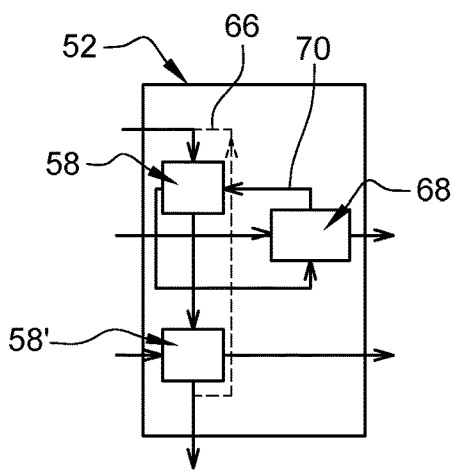
FIG. 7 is a schematic depiction of a heat exchanger of a hydrogen supply device illustrating another embodiment of the invention.

According to an embodiment visible in FIG. 7, the hydrogen heating system 52 comprises a first heat exchanger 58 configured to exchange heat energy between the hydrogen and an intermediate heat-transfer fluid 70 coming from a secondary heat exchanger 68 and a second heat exchanger 58' configured to exchange heat energy between the hydrogen and a heat-transfer fluid, such as hot air for example, coming from a turbomachine 40 or from an auxiliary power unit, the first and second heat exchangers 58, 58' being arranged in series. The secondary heat exchanger 68 is configured to exchange heat energy between the intermediate heat-transfer fluid 70 and a heat-transfer fluid, such as oil for example, coming from a turbomachine 40 or from an auxiliary power unit. In one configuration, the hydrogen heating system 52 comprises a return circuit 66 configured to tap off some of the heated hydrogen leaving the hydrogen heating system 52 and reintroduce it to the inlet of the latter.

Figure 8:
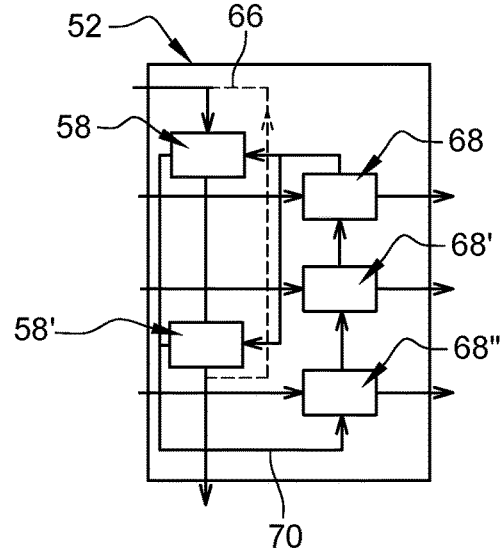
FIG. 8 is a schematic depiction of a heat exchanger of a hydrogen supply device illustrating another embodiment of the invention.

According to an embodiment visible in FIG. 8, the hydrogen heating system 52 comprises at least two main heat exchangers 58, 58' arranged in series and configured to exchange heat energy between the hydrogen and the one same intermediate heat-transfer fluid 70 passing through at least a secondary heat exchanger 68. In one configuration, the hydrogen heating system 52 comprises first, second and third secondary heat exchangers 68, 68', 68" arranged in series and through which there passes the intermediate heat-transfer fluid 70 which passes through the first and second main heat exchangers 58, 58' in parallel. The first secondary heat exchanger 68 is configured to exchange heat energy between the intermediate heat-transfer fluid 70 and a heat-transfer fluid, such as oil for example, coming from a turbomachine 40 or from an auxiliary power unit. The second secondary heat exchanger 68' is configured to exchange heat energy between the intermediate heat-transfer fluid 70 and a heat-transfer fluid, such as hot air for example, coming from a turbomachine 40 or from an auxiliary power unit. The third secondary heat exchanger 68" is configured to exchange heat energy between the intermediate heat-transfer fluid 70 and a heat-transfer fluid coming from another heat source 64 of the aircraft.

The secondary heat exchanger or exchangers may be arranged in the nacelle 38.

Of course, the invention is not restricted to these combinations of heat exchangers.

According to another embodiment, the hydrogen heating system 52 is an electrical heating system comprising at least one resistive electrical element powered by an electrical source, for example an electric battery or any other electrical source of the aircraft.

According to another embodiment, the hydrogen heating system 52 is a heating system employing catalysis, for example consuming hydrogen in order to produce heat.

Of course, the invention is not restricted to these embodiments of the hydrogen heating system 52. Thus, the hydrogen heating system 52 comprises at least one heat exchanger, at least one electrical heating system and/or at least one catalysis heating system.

According to an embodiment illustrated in FIGS. 9 and 10, the turbomachine 40 is not positioned in the nacelle 38. The turbomachine 40 is positioned as close as possible to the fuselage 32 in the region of a junction 72 connecting the fuselage 32 and the wing structure 34. The turbomachine 40 may, as the case may be, be positioned under, in or on the wing structure 34.

According to one configuration, all the turbomachines 40 coupled to a multiblade propeller 42 are positioned on each side of the fuselage 32 in the junction regions 72 connecting the fuselage 32 and the wing structure 34.

For each turbomachine 40 positioned in the junction region 72 connecting the fuselage 32 and the wing structure 34 and which is coupled to a multiblade propeller 42, the aircraft comprises a mechanical driveline 74 connecting the turbomachine 40 and the multiblade propeller 42 and more particularly the reduction gearbox 44 coupled to the multiblade propeller 42.

In one configuration, each mechanical driveline 74 comprises at least a transmission shaft 74.1 and a coupling mechanism 74.2 provided at each end of each transmission shaft 74.1.

The act of positioning the turbomachine 40 or at least one turbomachine 40 in the junction region 72 connecting the fuselage 32 and the wing structure 34 means that the dimensions of the nacelle 38 and, more particularly, the cross section thereof (perpendicular to the rotation shaft A42 of the multiblade propeller 42) can be reduced, thereby contributing to improving the aerodynamic performance of the aircraft.

According to another advantage, that makes it possible to reduce the length of the double-walled pipes to the strict minimum, thereby contributing to reducing the risks of hydrogen leaks and to not increasing the on-board mass excessively.

According to one configuration, the turbomachine 40 or at least one turbomachine 40 comprises a rotor which has an axis of rotation 76 and it is positioned in such a way that this axis of rotation 76 is parallel to the longitudinal axis A32 of the fuselage 32. This configuration makes it possible to broaden the scope of options regarding the positioning of the fuel tanks 46. However, the invention is not restricted to this configuration, it being possible for the turbomachine 40 to be positioned in such a way that the axis of rotation 76 of the rotor thereof is perpendicular to or inclined with respect to the longitudinal axis A32 of the fuselage 32.

The invention is not restricted to the embodiments described hereinabove. Whatever the embodiment, the aircraft comprises at least one turbomachine 40 generating thrust at a propulsion unit. In certain embodiments, the turbomachine 40 generates the thrust directly and is positioned in the propulsion unit. In other embodiments, the turbomachine 40 is coupled to a multiblade propeller incorporated into the propulsion unit and the turbomachine is positioned in the propulsion unit or spaced away therefrom.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising
a fuselage, a wing structure, at least one propulsion unit connected to the wing structure and distant from the fuselage, said at least one propulsion unit comprising at least one turbomachine running on hydrogen and generating thrust at the propulsion unit, at least one fuel tank positioned in the fuselage, and configured to store hydrogen in liquid and cryogenic states, and at least one hydrogen supply device connecting the turbomachine and the fuel tank, the hydrogen supply device comprising at least one pump connected to the fuel tank and positioned in the fuselage in a vicinity of the fuel tank, and at least one hydrogen heating system positioned upstream of the turbomachine, wherein the hydrogen heating system is positioned in the fuselage or in a region of a junction connecting the fuselage and the wing structure, in a vicinity of the pump wherein the hydrogen heating system comprises at least one of a heat exchanger, an electrical heating system, or a catalysis-heating system, wherein the hydrogen heating system comprises a return circuit configured to tap off some of the heated hydrogen leaving the hydrogen heating system and reintroduce the heated hydrogen into an inlet of the hydrogen heating system.

2. The aircraft as claimed in claim 1, wherein the hydrogen heating system is separated from the fuel tank by a distance of less than 5 m.

3. The aircraft as claimed in claim 1, wherein the hydrogen heating system comprises at least a heat exchanger through which a stream of air bled from outside the aircraft passes.

4. The aircraft as claimed claim 1, wherein the hydrogen heating system comprises at least a heat exchanger configured to exchange heat energy between the hydrogen and a heat-transfer fluid coming from at least a source present in the aircraft.

5. The aircraft as claimed in claim 1, wherein the hydrogen heating system comprises at least a main heat exchanger configured to exchange heat energy between the hydrogen and an intermediate heat-transfer fluid passing through at least a secondary heat exchanger.

6. The aircraft as claimed in claim 1, wherein the hydrogen heating system comprises at least two main heat exchangers arranged in series and configured to exchange heat energy between the hydrogen and a one same intermediate heat-transfer fluid passing through at least one secondary heat exchanger.

7. The aircraft as claimed in claim 1, wherein the at least one propulsion unit comprises a multiblade propeller, wherein the at least one turbomachine is positioned in the region of a junction connecting the fuselage and the wing structure, and wherein the aircraft comprises a mechanical drivetrain connecting the at least one turbomachine and the multiblade propeller.

8. The aircraft as claimed in claim 7, wherein the at least one turbomachine comprises a rotor which has an axis of rotation, and wherein the at least one turbomachine is positioned such that this axis of rotation is parallel to a longitudinal axis of the fuselage.

9. The aircraft as claimed in claim 1, wherein the hydrogen supply device comprises a first double-walled pipe connecting the fuel tank and the pump and a second double-walled pipe connecting the pump and the hydrogen heating system.

10. The aircraft as claimed in claim 9, wherein the hydrogen supply device comprises a third double-walled pipe connecting the hydrogen heating system and the at least one turbomachine.

11. The aircraft as claimed in claim 1, wherein the at least one propulsion unit is positioned on a first side of the fuselage, wherein said aircraft comprises at least a second propulsion unit positioned on a second side of the fuselage and connected to the wing structure, said second propulsion unit being distant from the fuselage and comprising a turbomachine, said aircraft comprising at least a second a hydrogen supply device connecting the turbomachine of the second propulsion unit and the fuel tank.

* * * * *